US006194688B1

(12) United States Patent
Ellis

(10) Patent No.: US 6,194,688 B1
(45) Date of Patent: Feb. 27, 2001

(54) BAKING OVEN FOR COATED PARTS

(76) Inventor: Frederick G. Ellis, 80 Burnett Avenue, Winnipeg (CA), R2G 1C1

( * ) Notice: Subject to any disclaimer, the term of this patent is extended or adjusted under 35 U.S.C. 154(b) by 0 days.

(21) Appl. No.: 09/507,694

(22) Filed: Feb. 22, 2000

Related U.S. Application Data

(63) Continuation-in-part of application No. 09/334,660, filed on Jun. 17, 1999.

(51) Int. Cl.[7] .......... A21B 1/00

(52) U.S. Cl. .......... 219/400; 219/388; 99/342; 432/9; 432/11; 432/121

(58) Field of Search .......... 219/388, 391, 219/400, 405, 521; 432/9, 11, 121, 128, 141, 142, 162; 34/216, 217, 236, 266, 328, 429, 438, 451, 498, 500, 545, 580, 658, 659, 660, 661, 664; 99/329 P, 342

(56) References Cited

U.S. PATENT DOCUMENTS

| | | |
|---|---|---|
| 3,649,812 | 3/1972 | Wilson . |
| 4,004,129 | 1/1977 | Hicks . |
| 4,009,301 | 2/1977 | Heckman et al. . |
| 4,517,447 | 5/1985 | Hicks . |
| 4,610,886 | 9/1986 | Buller-Colthurst . |
| 4,719,332 | 1/1988 | Markuson, Jr. . |
| 5,000,985 | 3/1991 | Salisbury . |
| 5,030,809 | 7/1991 | Buday . |
| 5,155,335 | 10/1992 | Habaki et al. . |
| 5,158,224 | 10/1992 | Baker et al. . |
| 5,266,766 | 11/1993 | Hecox . |
| 5,277,104 | 1/1994 | Colaner . |
| 5,619,911 | 4/1997 | Voegtlin . |
| 5,816,798 | 10/1998 | Strohmaier . |
| 5,821,503 | 10/1998 | Witt . |
| 5,906,484 | 5/1999 | Imai . |
| 5,922,230 | 7/1999 | Yokota . |

*Primary Examiner*—Teresa Walberg
*Assistant Examiner*—Fadi H. Dahbour
(74) *Attorney, Agent, or Firm*—Adrian D. Battison; Michael R. Williams

(57) ABSTRACT

An apparatus for baking powder coated parts comprises a housing having a top end and a bottom end, a heating element in the housing at the top end, defining an oven, a carrying arrangement in the housing for carrying the parts and a control station for controlling the heating element and the carrying arrangement such that the carrying arrangement carries the parts from the bottom end where the parts are attached to the carrying arrangement to the top end where the parts are heated by the heating element and to lower the carrying arrangement from the top end to the bottom end after the parts have been heated and a second batch of parts can be attached to the carrying arrangement. The control station has a first locator at the top end for indicating when the carrying arrangement is at the top and a second locator at the bottom end for indicating when the carrying arrangement is at the bottom end. The carrying arrangement is mounted on a guide which has a track located on respective side walls in the housing, a pair of wheel arrangements on the carrying arrangement engage each track and a cable is supported by a series of pulleys and is connected to a cable wrench which is controlled by the control station for driving the carrying arrangement in the housing. The carrying arrangement has a removable rack comprising a series of hooks in which the parts are attached. The bottom end has an opening such that the carrying arrangement is accessible. The housing has insulated oven panels. The control station has an up control, a pause control, a down control, a temperature control meter and an upper holding time control. The top end has an air blower for circulating the heated air in the oven mixing the air and making the temperature of the heat uniform.

17 Claims, 4 Drawing Sheets

BAKING OVEN FOR COATED PARTS

This application is a continuation-in-part of application Ser. No. 09/334,660, filed Jun. 17, 1999 and now abandoned

FIELD OF THE INVENTION

The present invention relates to an oven for baking coated parts and to a method of baking coated parts.

BACKGROUND OF THE INVENTION

Various products require a coating applied thereto to be baked to cure the coating so that it is fixed to the part. One example is that of circuit boards where a coating is applied and then baked. Another example relates to the powder coating of metal parts which is a relatively recent method for protecting and beautifying products. Powder coating makes a product highly chip and scratch resistant and a highly chemical, petroleum and salt resistant. Powder coating has the ability to apply a thick, even coat without drips or sags and has premium insulating qualities, both electrical and thermal and also removes the cold feeling from metals. It gives a decorative finish to a product along with a protective finish which is resistant to fading. Powder coating has the ability to encapsulate products, wrap around corners, help eliminate sharp edges achieve with one high quality coat with no primary necessary and can resist abuse in low and high temperature variances. Powder coating has virtually unlimited number of colours and a wide variety of finishes.

Generally powder coating is applied to many metal products powder coatings are 100% solids coatings applied as a dry powder mix of resin and pigment and subsequently formed into a film with heat. The solid resin binder melts upon heating, binds the pigment, and results in a pigment coating upon cooling. The powder is applied either by an electrostatic spray or by passing the part over a fluidised bed of powder. In both cases the parts undergo subsequent oven heating to provide a smooth continuous film.

Powder coated materials have to be heated in an oven or the like, an example of a powder coat oven is shown in U.S. Pat. No. 5,155,335 of Habaki et al wherein the oven has an inlet air shield chamber connected to a horizontal heating chamber. The oven of Habaki has a generally horizontal conveyor which is limited to one item at a time in the oven on the conveyor which is adequate for large items which need to be relatively spaced out but is not very effective for small items such as jewellery and the like.

U.S. Pat. No. 4,009,301 of Heckman et al discloses a method for powder coating materials. A large apparatus is used to carry items on a conveyor through a series of steps wherein the item is powder coated and baked.

U.S. Pat. No. 5,000,985 of Salisbury shows a similar method of powder coating wherein materials are carried on a conveyor through the processes.

The above patents are not effective for small objects and are relatively inefficient. it will be appreciated that the parts which are relatively small are generally suspended on the carriage from a hook or the like so that each is separate as it passes through the oven.

SUMMARY OF THE INVENTION

It is one object of the present invention to provide a baking oven and a method of coating parts which enables a user to bake a relatively large number of items at a simultaneously and be relatively efficient.

According to one aspect of the invention there is provided an apparatus for baking a batch of parts comprising:

- a housing having closed side walls and a closed top wall defining an insulated and substantially closed top end and an open bottom end;
- a heating element within the housing for generating heat in the housing such that the top end reaches an oven temperature for baking the parts;
- a carrying arrangement in the housing for carrying the batch of parts;
- a guide track system for guiding movement of the carrying arrangement from a first position exposed at the bottom end to a second position at the top end where the parts are heated by the heating element;
- the carrying arrangement being arranged such that the batch of parts is loaded for heating at the first position;
- the guide track system being arranged such that the carrying arrangement is moved vertically upwardly along the guide track system in a path from the first position to the second position, where the carrying arrangement is held stationary for heating of the parts, and is moved from the second position back to the first position vertically downwardly along the guide track system in the same path;
- and a control system for controlling the heating element relative to the carrying arrangement such that the parts are heated in the second position and a second batch of parts can be attached to the carrying arrangement in the first position.

Preferably the control system includes a first locator at the second position for indicating when the carrying arrangement is at the second position and a second locator at the first position for indicating when the carrying arrangement is at the first position.

Preferably the guide track system includes first and second tracks each located on a respective one of two side walls in the housing, wherein a pair of wheel arrangements on the carrying arrangement engage each track and wherein a cable is supported by a series of pulleys for driving the carrying arrangement vertically upwardly and downwardly in the housing between the first and second positions.

Preferably the carrying arrangement has a removable rack comprising a series of hooks from which the parts depend.

Preferably the control system has a temperature control meter for controlling the heating element and a time control for controlling a dwell time during which the carrying arrangement is maintained at the second position.

Preferably the housing includes an air blower for circulating the heated air in the housing.

Preferably a ventilation outlet is arranged to remove toxic fumes from the housing and release the fumes outside into the atmosphere.

Preferably the housing has reflective inner walls to reflect infrared rays emitted by the heating element.

According to a second aspect of the invention there is provided a method for coating a plurality of parts comprising:

- coating the parts with a coating material to be baked:
- carrying the parts on a rack:
- providing a baking oven having a housing having closed side walls and a closed top wall defining an insulated and substantially closed top end and an open bottom end;
- providing a heating element within the housing for generating heat in the housing such that the top end reaches an oven temperature for baking the parts;
- providing a carrying arrangement in the housing for carrying the batch of parts;

providing a guide track system for guiding movement of the carrying arrangement from a first position exposed at the bottom end to a second position at the top end where the parts are heated by the heating element;

loading the rack of parts on the carrying arrangement at the first position;

moving the carrying arrangement vertically upwardly along the guide track system in a path from the first position to the second position, where the carrying arrangement is held stationary for heating of the parts;

moving the carrying arrangement from the second position back to the first position vertically downwardly along the guide track system in the same path;

unloading the rack of parts at the first position;

and controlling the heating element relative to the carrying arrangement such that the parts are heated in the second position.

Preferably the rack is removable from the carrying arrangement and includes a series of hooks from which the parts depend.

Preferably the control system has a temperature control meter for controlling the heating element and a time control for controlling a dwell time during which the carrying arrangement is maintained at the second position.

Preferably the control system is arranged to maintain the heating element on as the parts pass the heating element while moving to the second position to apply a heat shock to the parts.

Preferably the control system is arranged to maintain the heating element off as the parts pass the heating element while moving to the first position to prevent application of excess heat to the parts.

Preferably the housing includes an air blower for circulating the heated air in the housing.

Preferably the air blower for circulating the heated air in the housing includes a duct having an intake adjacent the heating element and a discharge adjacent the top.

Preferably a ventilation outlet is arranged to remove toxic fumes from the housing and release the fumes outside into the atmosphere.

Preferably the ventilation outlet includes an injection venturi for starting an air flow therethrough arranged to remove toxic fumes from the housing and release the fumes outside into the atmosphere.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
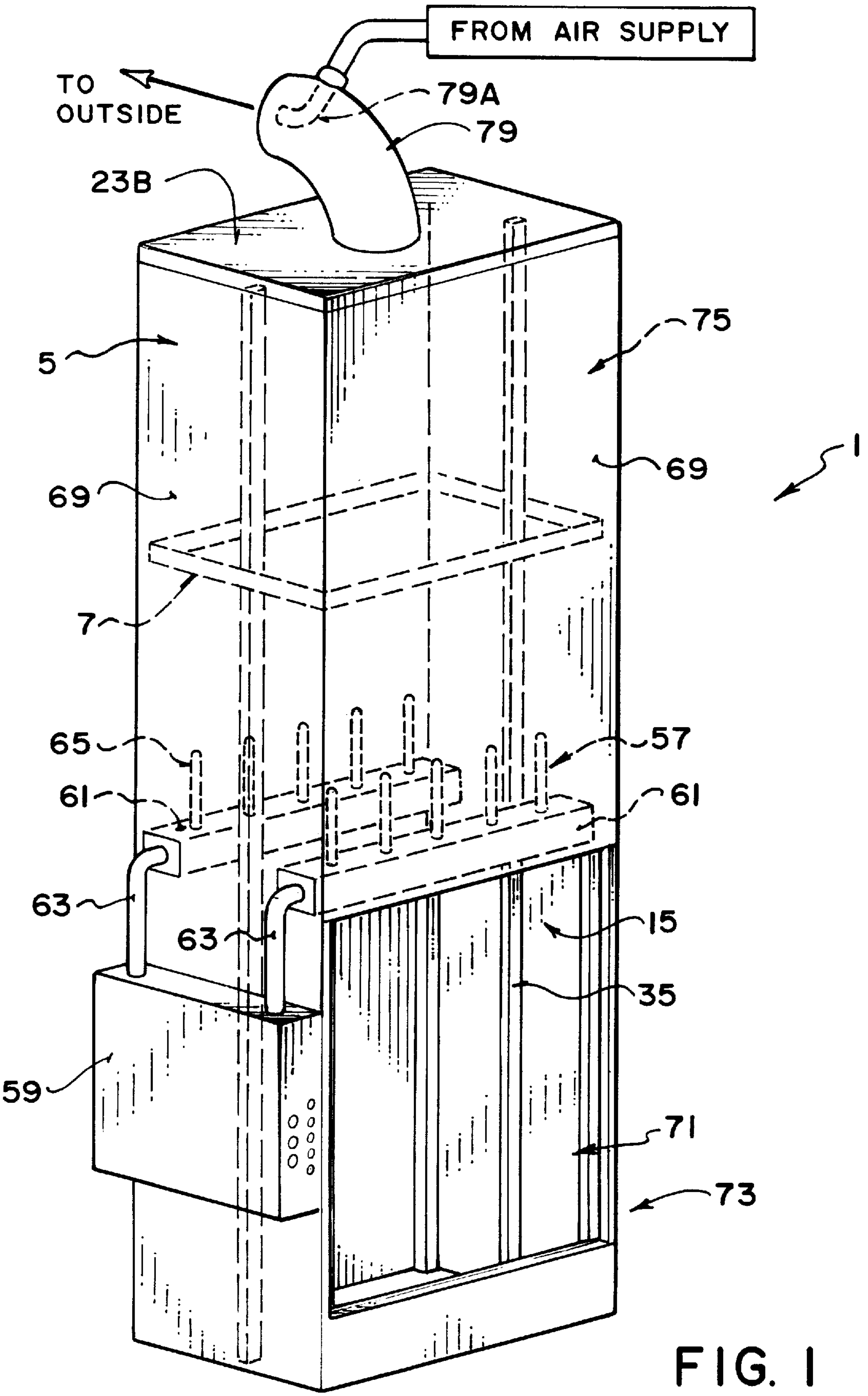
FIG. 1 is an isometric view of the present invention.
Figure 2:
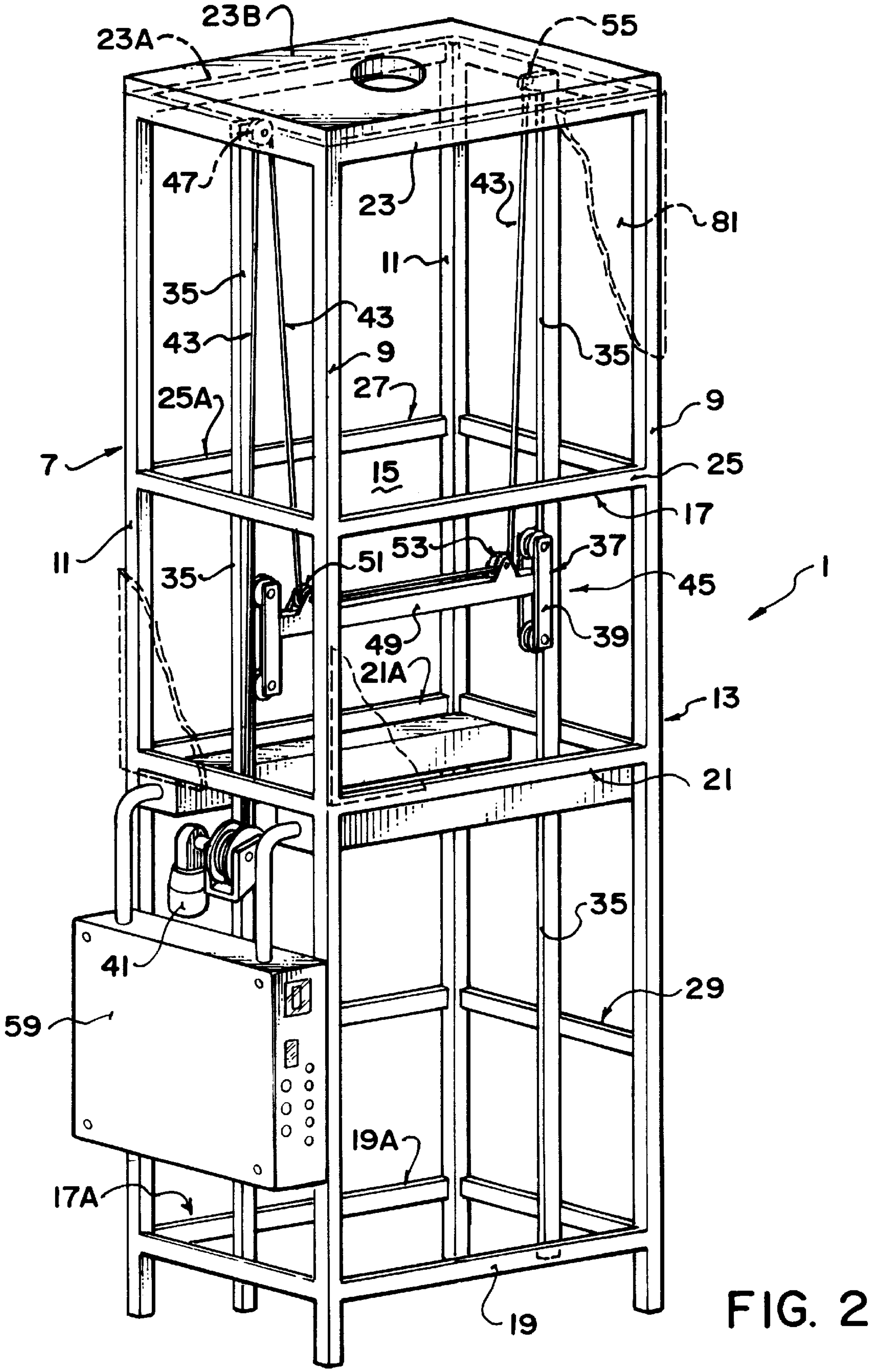
FIG. 2 is an isometric view with a portion of the side walls removed.
Figure 3:
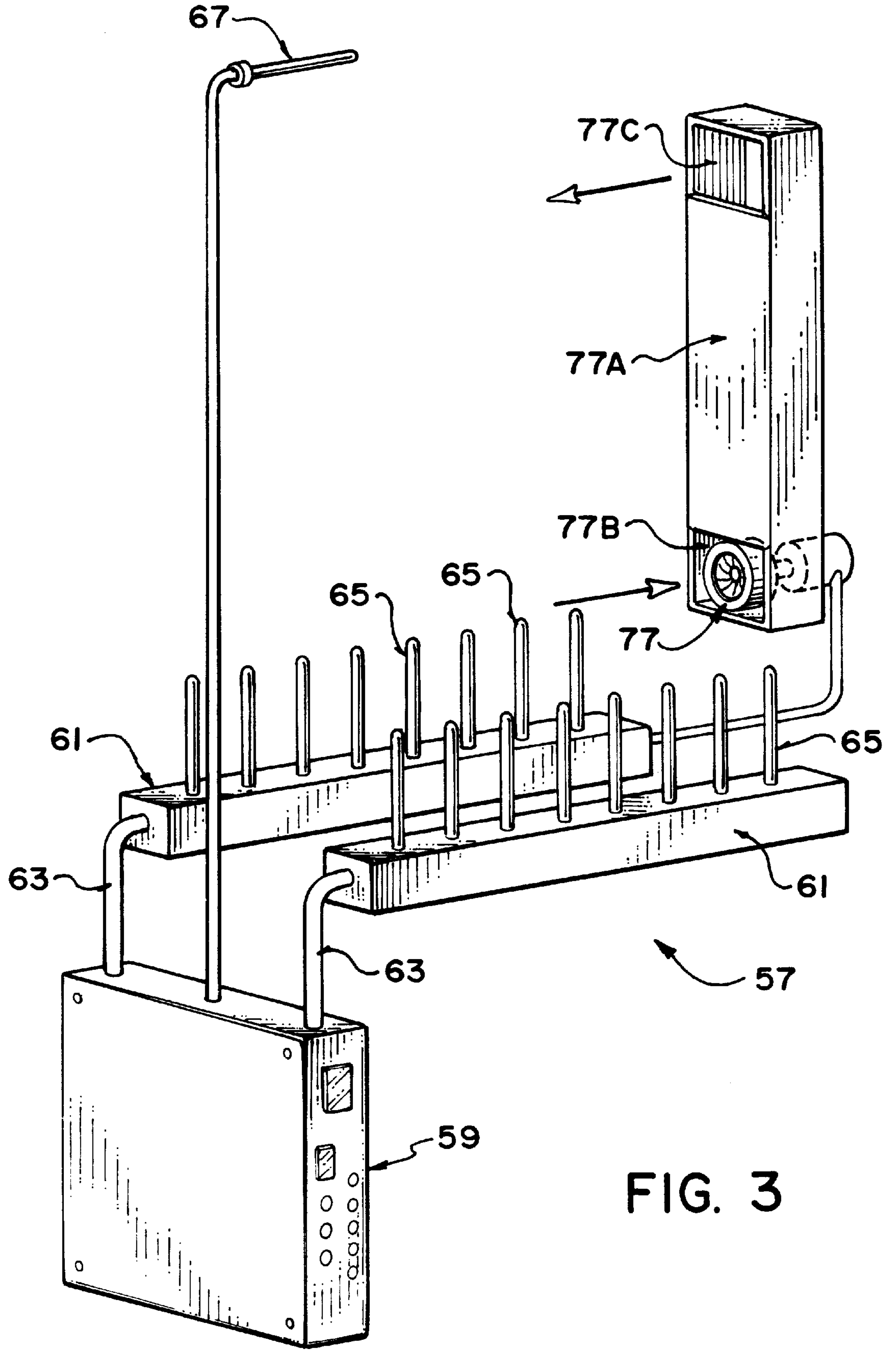
FIG. 3 is an isometric view of the heating element.
Figure 4:
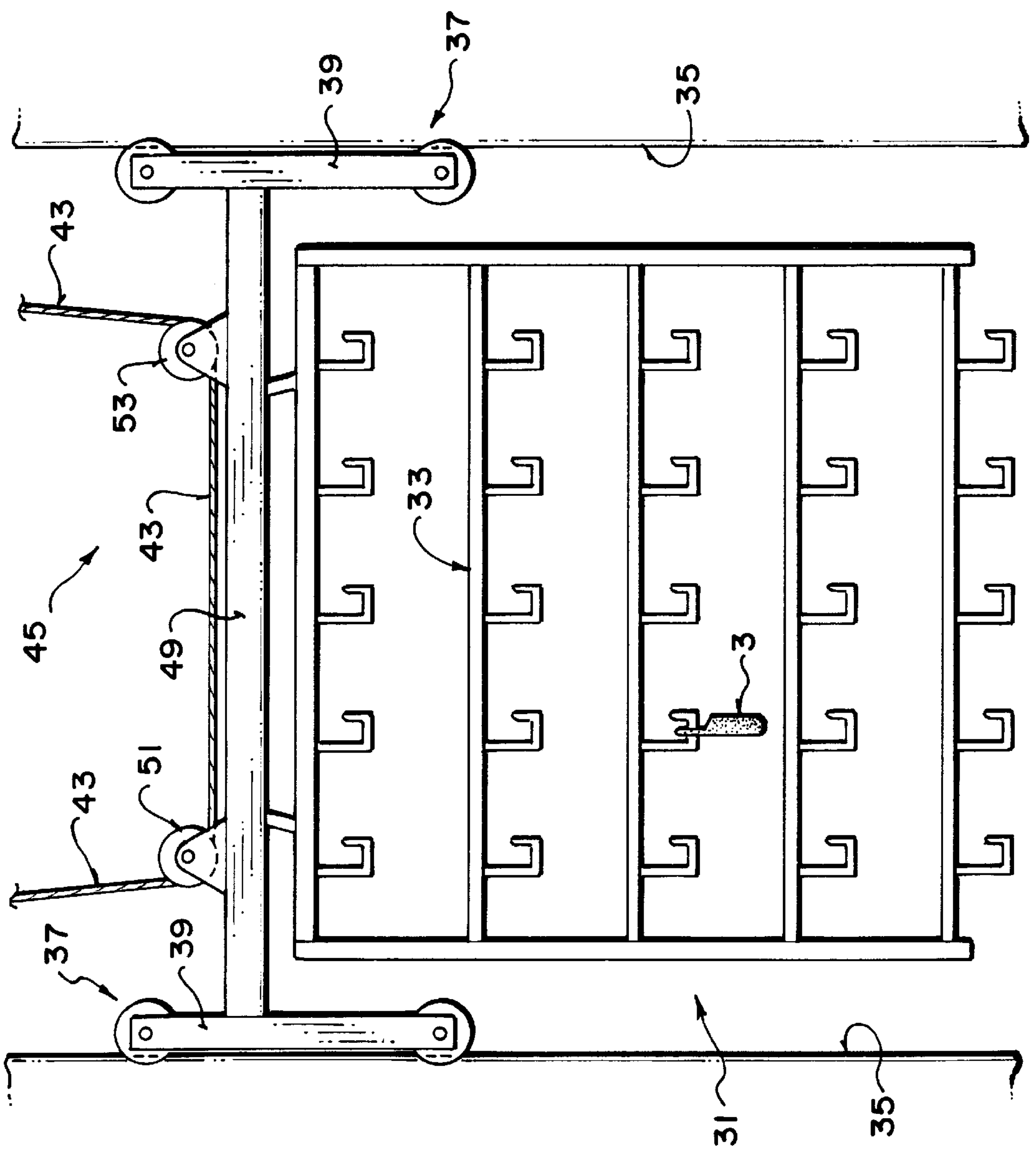
FIG. 4 is a top plan view of the carrying arrangement.

As shown in FIGS. 1 and 2, a baking oven, generally indicated a 1, is arranged to bake parts 3 which have been coated with a suitable coating material such as powder coat.

Powder coatings are 100% solids coatings applied as a dry powder mix of resin and pigment and subsequently formed into a film with heat. The solid resin binder melts upon heating, binds the pigment, and results in a pigment coating upon cooling. The powder is applied either by an electrostatic spray or by passing the heated object over a fluidised bed of powder with subsequent oven heating to provide a smooth continuous film.

The oven has a housing 5 and a frame 7 for supporting the housing. The frame has two elongate front vertical posts 9 and two elongate rear vertical posts 11 arranged parallel to each other and the two front posts and the two rear posts are spaced equidistantly apart such that the frame is rectangular shaped being higher than it is wide. A plurality of cross beams 13 connect the vertical posts such that the frame has a hollow interior 15. A first set of cross beams 17 connect the front posts wherein a first beam 19 is located generally at the bottom of the posts, a second beam 21 located approximately at the middle of the posts, a third beam 23 is located at the further most top end of the posts and a fourth beam 25 is located between the second beams and the third beam. A second set of cross beams 27 connect the rear posts wherein a first beam 19A is located generally at the bottom of the posts at the same height and parallel to the first beam 19 of the first set. A second beam 21A located approximately at the middle of the posts at the same height and parallel to the second beam 21 of the first set. A third beam 23A is located at the further most top end of the posts at the same height and parallel to the third beam 23 of the first set. A fourth beam 25A is located between the second and third beam at the same height and parallel to the fourth beam 25 of the first set and a fifth beam 27 is located between the first and second beam of the second set. The first set and second set of beams being parallel and of the same length.

A set of side beams 29 connect the front posts to the rear posts being perpendicular to and at the same height as each of the second set of beams connecting a respective front post to a respective rear post. The side beams are shorter in length than the first and second set of beams.

A carrying arrangement 31 is arranged to carry the parts upwardly and downwardly on a rack 33 in the hollow interior of the frame. The carrying arrangement is mounted on tracks 35 which extend upwardly from the bottom end along each side of the frame on the side beams parallel to the posts. The tracks are arranged to support a wheel arrangement 37. The wheel arrangement consists of a vertical wheel arm 39 on respective sides of the carrying arrangement which have a wheel at respect ends of the wheel arm. The wheels engage the track such that the carrying arrangement is movable upwardly and downwardly through the hollow interior along the track. The carrying arrangement is moved by a motor 41 mounted on the frame on a cross beam adjacent to the middle beam which drives a cable 43. The cable runs through a series of pulleys 45 which are located within the housing. A first pulley 47 located at the top end mounted on the cross beam, a second pulley 51 is mounted on the carrying arrangement at a cross bar 49 extending horizontally across the frame connecting the vertical wheel arms, third pulley 53 is mounted on a respective end of the cross bar and a cable support 55 is mounted at the top end on the opposite side of the first pulley. The cable is held in position by the cable support such that the motor winds up and unwinds the cable through the series of pulleys such that the carrying arrangement is moved directly vertically upwardly and downwardly in the oven, as mentioned above. Thus the carrying arrangement follows the same vertical path in its movement with no side to side or horizontal movement which could cause shaking or jiggling of the parts.

A heating arrangement 57 in the oven is arranged to heat the parts when raised by the carrying arrangement. The heating arrangement consists of a main control panel 59 which has a main breaker and controls the motors up and down drive, pauses the motor and controls the temperature and has a holding timer for holding the parts in the carrying arrangement at the top end of the oven for baking.

The heating arrangement has a pair of wiring ducts 61 which are respectively mounted on the middle beam 21 and 21A. Each wiring duct is connected to the control panel and has a wiring arrangement 63 running through the ducts which connect to electric elements to produce heat. The wires pass through a plurality of resistor elements 65 extending upwardly from the duct which creates heat in the oven. The heat is developed by the passage of current through the distributed resistors.

A pyrometer thermocouple 67 is located at the top end in the oven for measuring the temperature of the oven so that the oven can be heated at a certain temperature. A blower 77 is mounted in a duct 77A at one side of the oven at the heating elements which draws air inwardly at a bottom inlet 77B, moves the hot air vertically upwardly inside the duct and releases the air at a top outlet 77C so that the oven uses a convection method for baking the parts.

The housing comprises insulated oven panels 69 arranged such that the oven is fully closed at the side walls and top and an opening 71 is located only at the bottom defining a loading and unloading zone 73 below the open bottom of the oven 75. The oven has an insulated top 23B in which a ventilation outlet 78 is located. The ventilation outlet is arranged to remove the toxic air from inside the oven and carry the air through a pipe so that the air is released outside the building. An injection venturi 79A is provided in the outlet 79 so that compressed air from a supply can generate a current through the outlet to the exterior through a flue which is then continued by convection to draw of a steady stream of air carrying toxic contaminants. The air injection is generally only required at start up.

Inner walls 81 in the oven are made of reflective material, such as stainless steel or galvanised zinc, so that the infrared rays are rebounded onto the parts for baking.

In operation, after powder coating, the parts are placed onto the rack which is then placed onto the carrying arrangement. The control panel is activated such that the carrying arrangement is raised vertically into the oven. The carrying arrangement is held in the oven for a predetermined amount of time so that the parts are baked and the carrying arrangement is lowered so that the rack can be removed and a second set of parts on a second rack can be placed onto the carrying arrangement for baking. When heating powder coat material, the heating elements are in the heating condition applying direct infra-red heating when the carrying arrangement transports the parts past the heating elements so as to apply an initial shock heat effect. This acts to start the curing which is continued when the rack reaches the closed top of the oven for the baking period as set by the control system. The heating elements are then turned off when the parts are moved back down to the loading position so as prevent application of excess direct heat which could cause blistering of the coat. When heating other types of coating material on other products, the heating elements will often be kept off as the parts pass in the upward direction to prevent direct heat and to allow only the indirect convection heating after the parts reach the upper oven part.

The vertical orientation of the oven creates an efficient unit with low energy costs and requires a very small floor space in a building. The oven allows easy loading and unloading of the rack of parts and the parts are maintained stationary on their hanging rack during movement by the direct vertical movement along the path of the tracks.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. An apparatus for baking a batch of parts comprising:

a housing having closed side walls and a closed top wall defining an insulated and substantially closed top end and an open bottom end;

a heating element within the housing for generating heat in the housing such that the top end reaches an oven temperature for baking the parts;

a carrying arrangement in the housing for carrying the batch of parts;

a guide track system for guiding movement of the carrying arrangement from a first position exposed at the bottom end to a second position at the top end where the parts are heated by the heating element;

the carrying arrangement being arranged such that the batch of parts is loaded for heating at the first position;

the guide track system being arranged such that the carrying arrangement is moved vertically upwardly along the guide track system in a path from the first position to the second position, where the carrying arrangement is held stationary for heating of the parts, and is moved from the second position back to the first position vertically downwardly along the guide track system in the same path;

and a control system for controlling the heating element relative to the carrying arrangement such that the parts are heated in the second position and a second batch of parts can be attached to the carrying arrangement in the first position.

2. The apparatus according to claim 1 wherein the control system includes a first locator at the second position for indicating when the carrying arrangement is at the second position and a second locator at the first position for indicating when the carrying arrangement is at the first position.

3. The apparatus according to claim 1 wherein the guide track system includes first and second tracks each located on a respective one of two side walls in the housing, wherein a pair of wheel arrangements on the carrying arrangement engage each track and wherein a cable is supported by a series of pulleys for driving the carrying arrangement vertically upwardly and downwardly in the housing between the first and second positions.

4. The apparatus according to claim 1 wherein the carrying arrangement has a removable rack comprising a series of hooks from which the parts depend.

5. The apparatus according to claim 1 wherein the control system has a temperature control meter for controlling the heating element and a time control for controlling a dwell time during which the carrying arrangement is maintained at the second position.

6. The apparatus according to claim 1 wherein the housing includes an air blower for circulating the heated air in the housing.

7. The apparatus according to claim 1 wherein a ventilation outlet is arranged to remove toxic fumes from the housing and release the fumes outside into the atmosphere.

8. The apparatus according to claim 1 wherein the housing has reflective inner walls to reflect infrared rays emitted by the heating element.

9. A method for coating a plurality of parts comprising:

coating the parts with a coating material to be baked:

carrying the parts on a rack:

providing a baking oven having a housing having closed side walls and a closed top wall defining an insulated and substantially closed top end and an open bottom end;

providing a heating element within the housing for generating heat in the housing such that the top end reaches an oven temperature for baking the parts;

providing a carrying arrangement in the housing for carrying the batch of parts;

providing a guide track system for guiding movement of the carrying arrangement from a first position exposed at the bottom end to a second position at the top end where the parts are heated by the heating element;

loading the rack of parts on the carrying arrangement at the first position;

moving the carrying arrangement vertically upwardly along the guide track system in a path from the first position to the second position, where the carrying arrangement is held stationary for heating of the parts;

moving the carrying arrangement from the second position back to the first position vertically downwardly along the guide track system in the same path;

unloading the rack of parts at the first position;

and controlling the heating element relative to the carrying arrangement such that the parts are heated in the second position.

10. The method according to claim 9 wherein the rack is removable from the carrying arrangement and includes a series of hooks from which the parts depend.

11. The method according to claim 9 wherein the control system has a temperature control meter for controlling the heating element and a time control for controlling a dwell time during which the carrying arrangement is maintained at the second position.

12. The method according to claim 9 wherein the control system is arranged to maintain the heating element on as the parts pass the heating element while moving to the second position to apply a heat shock to the parts.

13. The method according to claim 9 wherein the control system is arranged to maintain the heating element off as the parts pass the heating element while moving to the first position to prevent application of excess heat to the parts.

14. The method according to claim 9 wherein the housing includes an air blower for circulating the heated air in the housing.

15. The method according to claim 14 wherein the air blower for circulating the heated air in the housing includes a duct having an intake adjacent the heating element and a discharge adjacent the top.

16. The method according to claim 9 wherein a ventilation outlet is arranged to remove toxic fumes from the housing and release the fumes outside into the atmosphere.

17. The method according to claim 16 wherein the ventilation outlet includes an injection venturi for starting an air flow therethrough arranged to remove toxic fumes from the housing and release the fumes outside into the atmosphere.

* * * * *